United States Patent
Takeda

(10) Patent No.: US 7,212,475 B2
(45) Date of Patent: May 1, 2007

(54) METHOD AND APPARATUS FOR TILT CORRECTION AND TILT DRIVING SIGNAL GENERATING CIRCUIT

(75) Inventor: Hiroshi Takeda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 625 days.

(21) Appl. No.: 10/774,395

(22) Filed: Feb. 10, 2004

(65) Prior Publication Data

US 2004/0156278 A1   Aug. 12, 2004

(30) Foreign Application Priority Data

Feb. 12, 2003   (JP) .............................. 2003-033478

(51) Int. Cl.
  *G11B 7/00*   (2006.01)
(52) U.S. Cl. ................................ 369/44.32; 369/53.19; 369/53.12
(58) Field of Classification Search .................... None
  See application file for complete search history.

(56) References Cited

U.S. PATENT DOCUMENTS 5,805,543 A * 9/1998 Takamine et al. ......... 369/44.32

2002/0039338 A1 * 4/2002 Kadowaki et al. ........ 369/53.19
2002/0060964 A1 * 5/2002 Park ........................ 369/53.19
2002/0080692 A1 * 6/2002 Nagaoka et al. ......... 369/44.32

FOREIGN PATENT DOCUMENTS

| JP | 62-141636 | 6/1987 |
| JP | 01-213837 | 8/1989 |
| JP | 09-282693 | 10/1997 |
| JP | 2000-011414 | 1/2000 |
| JP | 2000-260042 | 9/2000 |

* cited by examiner

*Primary Examiner*—Muhammad Edun
(74) *Attorney, Agent, or Firm*—Dickstein Shapiro LLP

(57) ABSTRACT

In the tilt correction method, information about inclination of an object lens relative to an information recording medium is acquired. A direct current signal Sdc for correcting the inclination is produced based on the information. An alternating current signal Sac having a prescribed signal characteristic is superposed onto the direct current signal Sdc to produce a driving signal Sout. The driving signal Sout is supplied to a driving mechanism to correct the inclination of the object lens against friction.

18 Claims, 11 Drawing Sheets

FIG.11
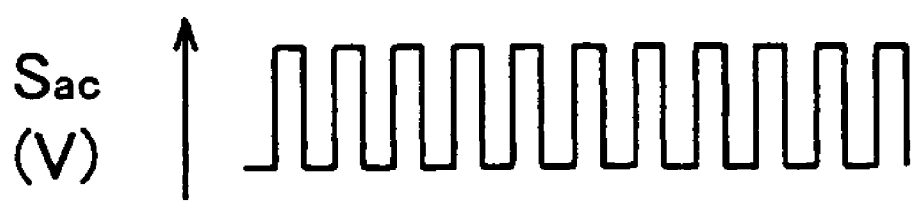
$S_{ac}$ (V)
$S_{dc}$ (V)
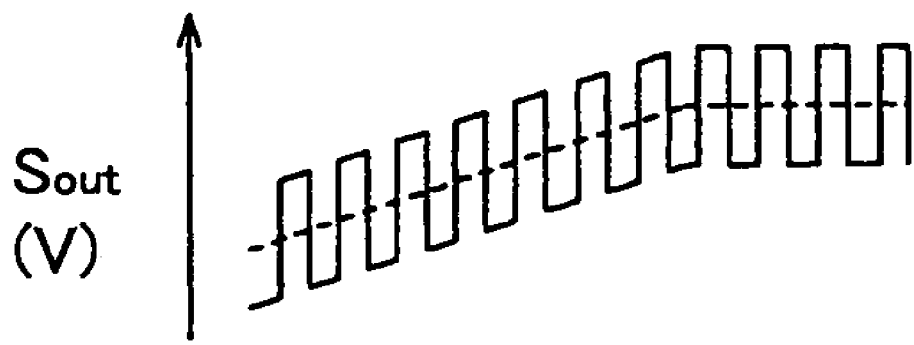
$S_{out}$ (V)

METHOD AND APPARATUS FOR TILT CORRECTION AND TILT DRIVING SIGNAL GENERATING CIRCUIT

BACKGROUND OF THE INVENTION

1. Field of the Invention

The present invention generally relates to tilt correction for an object lens relative to an information recording medium in an optical disk recorder/player, and more particularly, to a method and apparatus for correcting tilt relative to an information recording medium through superposition of signals.

2. Description of Related Art

With an optical disk apparatus (i.e., an optical disk recorder/player), a laser beam is guided onto the recording side of an information recording medium, such as an optical disk, to record information. The recorded information is reproduced based on the light reflected from the recording side. In general, the optical disk apparatus is provided with an optical pickup device, which emits a laser beam to form a light spot on the recording side of the information recording medium, as well as receiving light reflected from the recording side.

Generally, an optical pickup device has an optical system including an object lens, which guides a laser beam emitted from a light source onto the recording side of the optical recording medium and guides return light flux reflected from the recording side to a prescribed light-receiving position. The optical pickup device also has a light receiving element arranged at the light-receiving position to receive the return light flux. The light receiving element outputs not only information reproduced from the data recorded in the recording side of the medium, but also signals containing servo information required for positioning of the object lens and the optical pickup device itself.

In recent years and continuing, the recording density in information recording media is increasing in response to demand for increased recording capacities of information recording media. In order to increase the recording density, the diameter of the light spot formed on the recording plane has to be decreased. To achieve this, use of an object lens with a large numerical aperture is becoming popular. However, as the numerical aperture increases, influence of wavefront aberration due to offset of the optical axis of the object lens from a line perpendicular to the recording plane also increases. The offset of the optical axis of the object lens is referred to as "tilt", which is likely to cause deformation of the light spot, as well as degradation of signals output from the light receiving element and containing reproduced information and servo information.

There are two types of tilt correction, namely, a method for inclining the information recording medium relative to a fixed object lens, and a method for inclining the object lens relative to the information recording medium. The recent trend is employing the latter method due to demand for reducing the size of the tilt correction mechanism and for increasing the tilt correction speed. To adjust the inclination of the object lens, a tilt control mechanism is known, which is designed to bring the guide shaft attached to a fixed part of the optical pickup device into an opening formed in the movable part having the object lens and to rotate the movable part of the optical pickup device about the guide shaft against a frictional force between the movable part and the guide shaft.

For example, JPA 2000-260042 discloses a control apparatus for driving a carriage of the optical pickup device against a force of static friction.

However, driving the movable part of the optical pickup device against the frictional force, as in the above-described tilt correction technique using a tilt control mechanism, has a problem in that smooth motion of the movable part is hindered by the frictional force and the movable part cannot follow up the driving signal used to correct the inclination of the object lens. Consequently, the correction accuracy is likely to be degraded.

SUMMARY OF THE INVENTION

The present invention was conceived in view of the above-described problem in the prior art, and it is an object of the present invention to provide a tilt correction method and a tilt correction apparatus that is capable of accurately correcting inclination of an object lens relative to an information recording medium against friction produced during tilt correction, without increasing the cost and the size of the tilt correction apparatus.

It is another object of the invention to provide a tilt driving signal generating circuit that generates a driving signal suitable for accurate tilt correction for an object lens relative to an information recording medium, without causing the size and the cost to be increased.

It is still another object of the invention to provide an optical disk apparatus that allows stable and reliable access to the information recording medium.

To achieve the objects, in one aspect of the invention, a tilt correction method for correcting an inclination of an object lens relative to an information recording medium is provided. The method comprises the steps of:

(a) detecting the inclination of the object lens relative to the information recording medium;
(b) producing a direct current signal for correcting the inclination of the object lens;
(b) superposing an alternating current signal having a prescribed signal characteristic onto the direct current signal to produce a driving signal; and
(d) correcting the inclination of the object lens using a driving mechanism operated by the driving signal.

In this context, the term "information about inclination" includes not only inclination itself, but also information that varies according to the change in inclination, information that can be converted to an inclination, and signal information for controlling inclination of the object lens.

Since the driving signal contains an alternating current component oscillating along with the level of the direct current signal, inclination of the object lens can be corrected smoothly against friction produced in the tilt correcting mechanism, without causing increases in the size and the cost of the tilt correction mechanism.

The signal characteristic of the alternating current signal is varied depending on a tilt correction condition. The arrangement allows inclination of the object lens to be corrected to a target position in a flexible manner.

The superposition of the alternating current signal is stopped when the inclination is substantially corrected, and after that, only the direct current signal is supplied to the driving mechanism as the driving signal.

This arrangement can prevent power consumption from increasing during tilt correction.

In another aspect of the invention, a tilt driving signal generating circuit that generates a driving signal used to drive a movable part holding an object lens to correct inclination of the object lens relative to an information recording medium is provided. The circuit comprises (a) a first input terminal for receiving a direct current signal representing information about the inclination of the object lens, and (b) a superposition unit for superposing an alternating current with a prescribed signal characteristic onto the direct current signal to produce the driving signal.

BRIEF DESCRIPTION OF THE DRAWINGS

Other objects, features, and advantages of the present invention will become more apparent from the following detailed description when read in conjunction with the accompanying drawings, in which:

FIG. 11 is a timing diagram illustrating a superposed signal, a tilt correction signal, and a tilt control signal, where the superposed signal is continuously output during the access to the information recording medium.

DETAILED DESCRIPTION OF THE INVENTION

Figure 1:
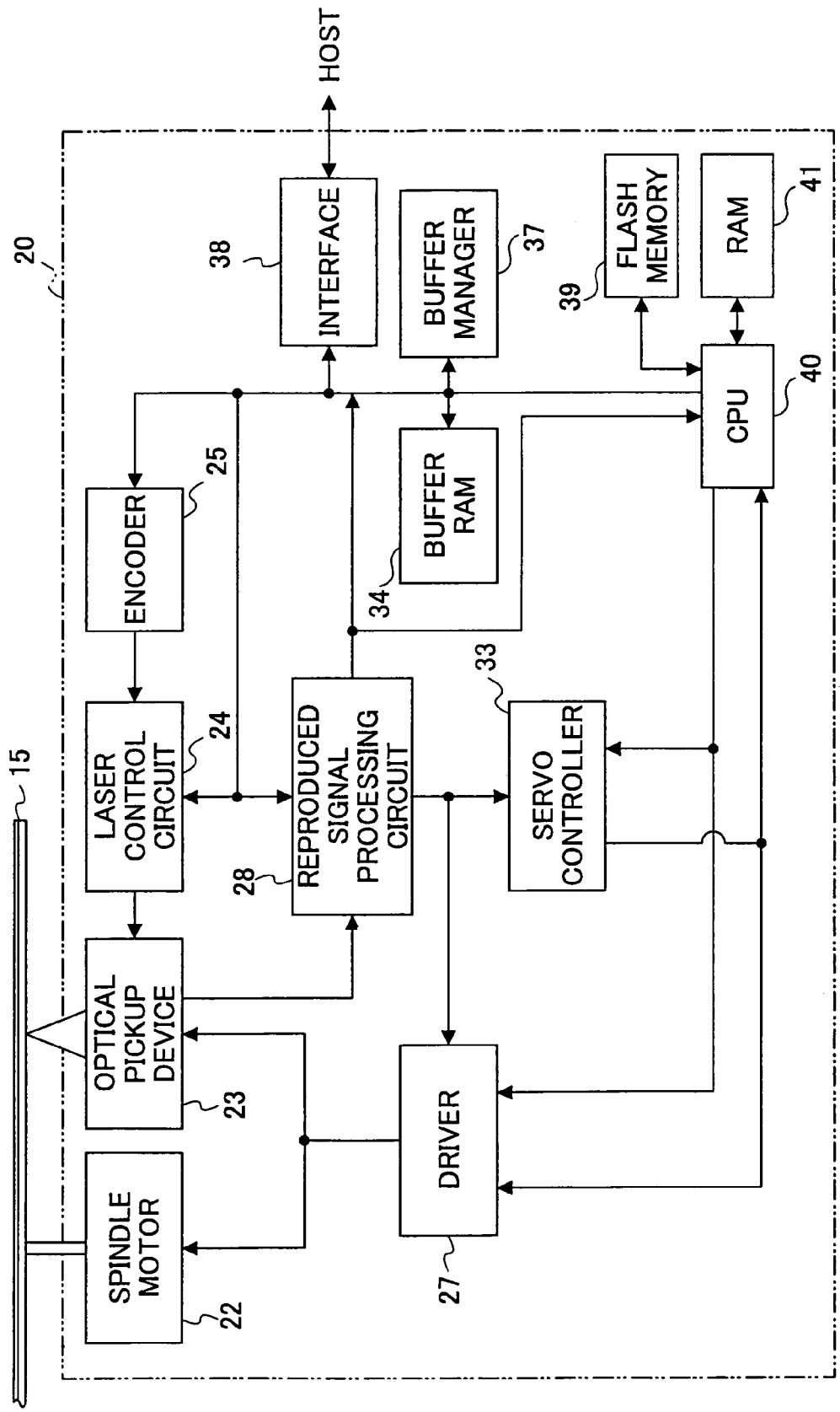
FIG. 1 is a block diagram of the optical disk apparatus according to an embodiment of the invention.

Tilt correction performed in an optical disk apparatus (i.e., an optical recorder/player) according to an embodiment of the invention is described below with reference to FIG. 1 through FIG. 9. FIG. 1 is a schematic block diagram of an optical disk apparatus according to an embodiment.

The optical disk apparatus 20 shown in FIG. 1 includes a spindle motor 22 for rotating an optical disk 15 (which is an example of an information recording medium), an optical pickup device 23, a laser control circuit 24, an encoder 25, a driver 27, a reproduced signal processing circuit 28, a servo controller 33, a buffer RAM 34, a buffer manager 37, an interface 38, a flash memory 39, a CPU 40, and a RAM 41. In FIG. 1, the arrows indicate typical signal flows or data flows, but are not intended to depict all the connections between the respective blocks. In this embodiment, an information recording medium conforming to the DVD (digital versatile disc) standard is used as the optical disk 15.

The optical pickup device 23 guides a laser beam onto a prescribed position on the recording side of the optical disk 15, in which spiral or concentric tracks are formed, and it receives the beam reflected from the recording side of the optical disk 15. The details of the optical pickup device 15 are described below.

Figure 2:
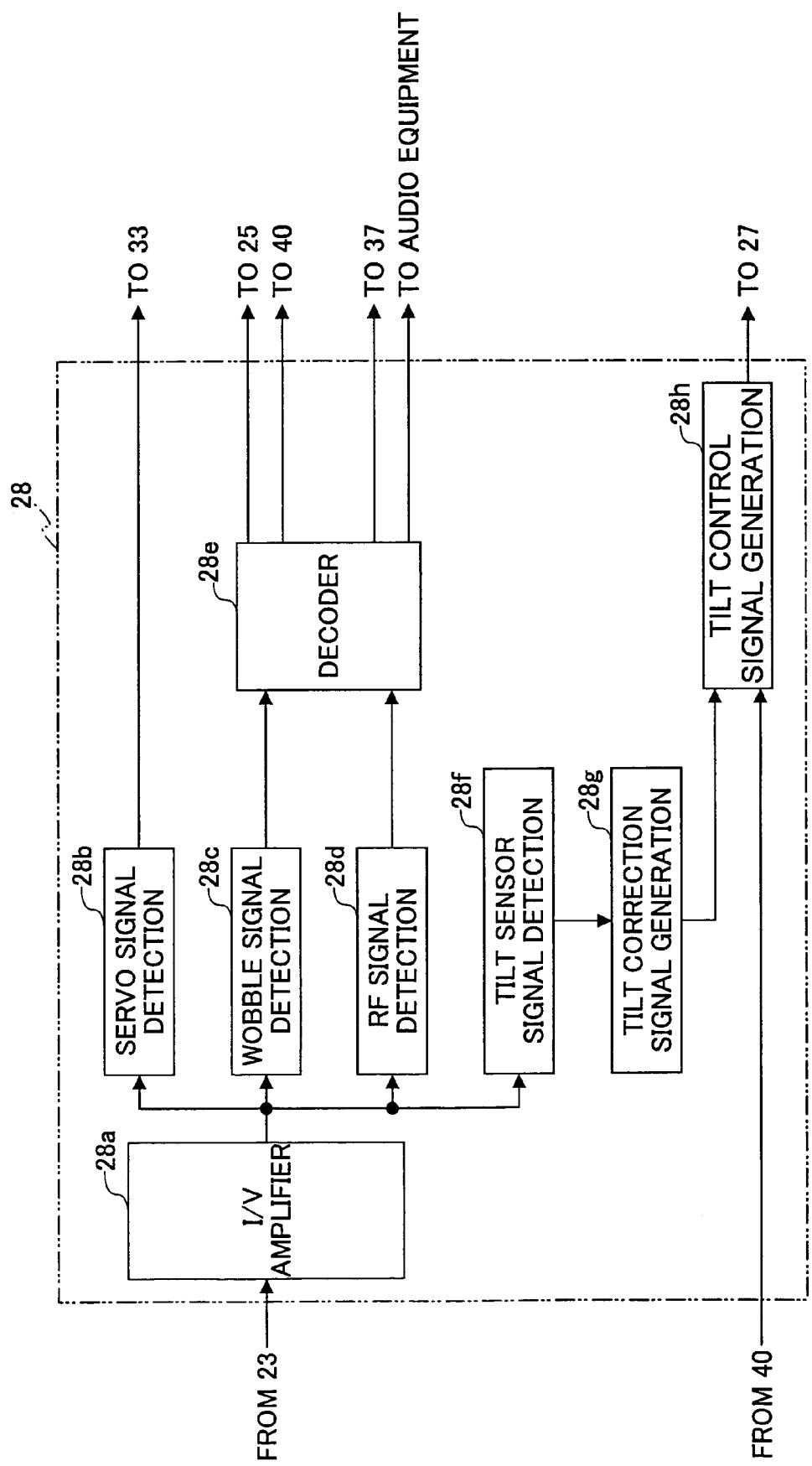
FIG. 2 is a block diagram of the reproduced signal processing circuit used in the optical disk apparatus shown in FIG. 1.

FIG. 2 illustrates the structure of the reproduced signal processing circuit 28. The reproduced signal processing circuit 28 includes an I/V amplifier 28a, a servo signal detection circuit 28b, a wobble signal detection circuit 28c, an RF signal detection circuit 28d, a decoder 28e, a tilt sensor signal detection circuit 28f, a tilt correction signal generating circuit 28g, and a tilt control signal generating circuit 28h.

The I/V amplifier 28a converts the electric current signal output from the optical pickup device 23 to a voltage signal, and amplifies the voltage signal with a prescribed gain. The servo signal detection circuit 28b detects a servo signal (including a focus error signal and a track error signal), based on the output signal of the I/V amplifier 28a. The servo signal detected by the servo signal detection circuit 28b is output to the servo controller 33. The wobble signal detection circuit 28c detects a wobble signal, based on an output voltage of the I/V amplifier 28a. The decoder 28e extracts ADIP (Address In Pregroove) information and a synchronizing signal from the wobble signal detected by the wobble signal detection circuit 28c. The ADIP information extracted from the wobble signal is output to the CPU 40, while the synchronizing signal is output to the encoder 25. The decoder 28e also carries out signal processing and error correction on the RF signal detected by the RF signal detection circuit 28d, and then stores the decoded signal as reproduced data in the buffer RAM 34 via the buffer manager 37. If the reproduced data are music data, then the output signal of the decoder 28e is supplied to the external audio system.

The tilt sensor signal detection circuit 28f detects a tilt sensor signal that corresponds to a tilt amount, based on the output of a tilt sensor TS (see FIG. 4), which is described below. The tilt correction signal generating circuit 28g produces a signal for correcting the tilt (which is referred to as a "tilt correction signal") from the tilt sensor signal, and supplies this tilt correction signal to the tilt control signal generating circuit 28f.

Figure 3:
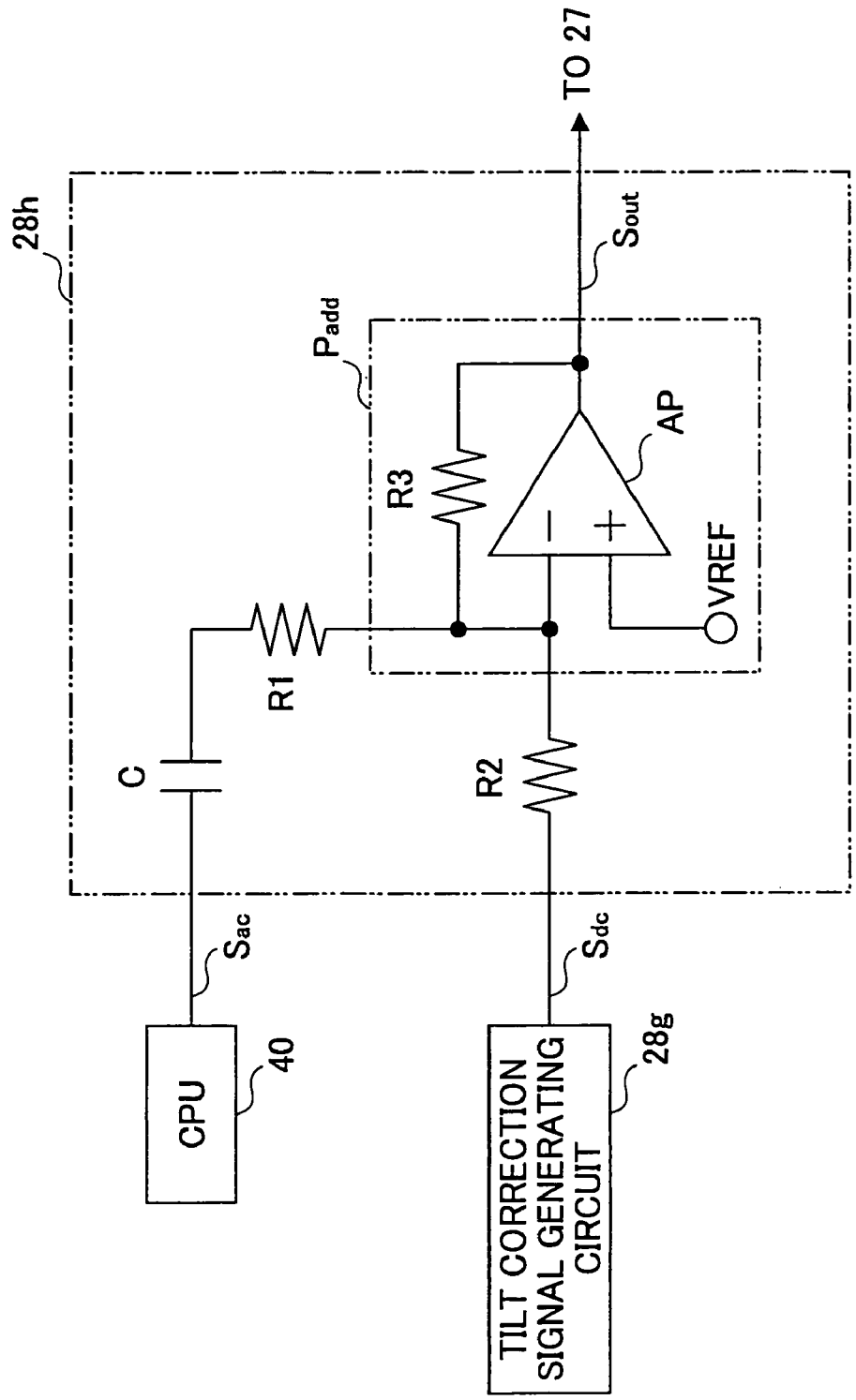
FIG. 3 is a circuit diagram of the tilt control signal generating circuit shown in FIG. 2.
Figure 4:
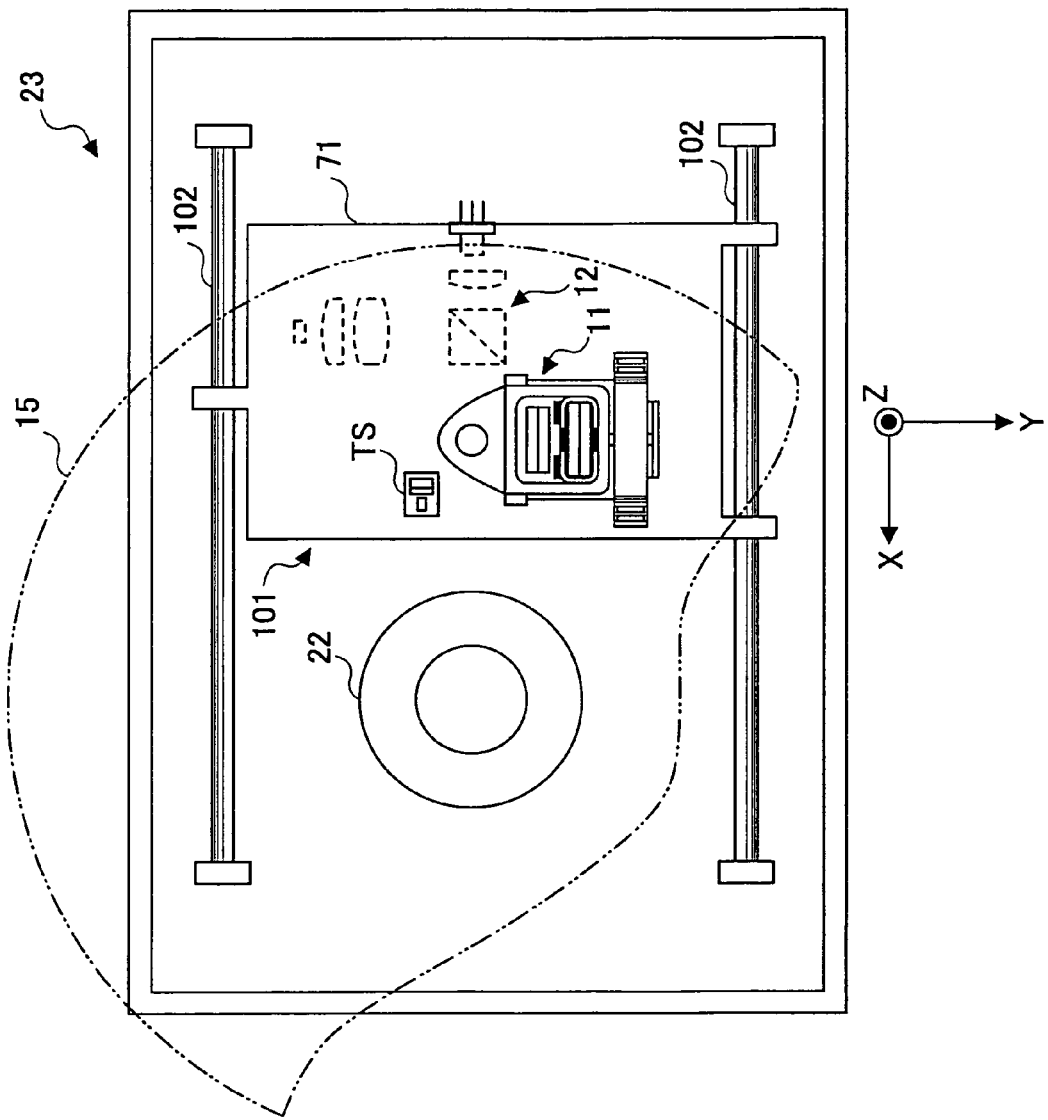
FIG. 4 is a plan view for explaining the structure of the optical pickup device used in the optical disk apparatus shown in FIG. 1.

FIG. 3 is an example of the tilt control signal generating circuit 28h, which includes a capacitor C, resistors R1 and R2, and an adding amplifier Padd, which functions as a superposition unit. The adding amplifier Padd has a resistor R3 and an amplifier AP. A pulse signal Sac (which is referred to as a "superposed signal") output from the CPU 40 is supplied as the first input signal to the adding amplifier Padd, via the capacitor C and the resistor R1. The first input signal is an alternating current signal (or an AC voltage signal). A tilt correction signal Sdc output from the tilt correction signal generating circuit 28g is supplied as the second input signal to the adding amplifier Padd, via the resistor R2. The second input signal is a direct current signal (or a DC voltage signal).

The adding amplifier superposes the first input signal onto the second input signal at a prescribed adding ratio, amplifies the summation with a prescribed gain, and outputs a tilt control signal Sout to the driver 27. The adding ratio of the superposed signal to the tilt correction signal and the gain can be adjusted using the capacitor C and the respective resistors.

Returning to FIG. 1, the servo controller 33 produces a control signal for correcting the focus offset, which is referred to as a "focus control signal", based on the focus error signal supplied from the reproduced signal processing circuit 28, and another control signal for correcting the track offset, which is referred to as a "tracking control signal"), based on the track error signal. These control signals are supplied from the servo controller 33 to the driver 27.

The driver 27 outputs a driving current according to the focus control signal from the servo controller 33, which is referred to as a "focus driving current", and a driving current according to the tracking control signal, which is referred to as a "tracking driving current", to the optical pickup device 23. The driver 27 also outputs a driving current according to a tilt control signal supplied form the CPU 40, which is referred to as a "tilt driving current", and a driving signal according to a seek control signal to the optical pickup device 23. The tilt control signal and the seek control signals are described below. The driver 27 further outputs a driving signal to the spindle motor 22 in response to an instruction from the CPU 40.

The buffer manager 37 manages input and output of data to and from the buffer RAM 34. When the amount of data accumulated in the buffer RAM 34 reaches a prescribed level, the buffer manager 37 reports it to the CPU 40.

The encoder 25 takes the data from the buffer RAM through the buffer manager 37 based on the instruction from the CPU 40, performs data modulation, and adds error correction codes to create data to be written in the optical disk 15. Furthermore, the encoder 25 outputs a writing signal to the laser control circuit 24 in synch with the synchronizing signal supplied from the reproduced signal processing circuit 28, based on the instructions from the CPU 40.

The laser control circuit 24 outputs a control signal for controlling output of the laser beam irradiating the optical disk 15, which is referred to as an "LD control signal", to the optical pickup device 23, based on the writing signal from the encoder 25 and the instruction from the CPU 40.

The interface 38 is a bi-directional communication interface with a host (a personal computer, for example), which is a standardized interface such as ATAPI (AT Attachment Packet Interface), SCSI (Small Computer System Interface), or USB (Universal Serial Bus).

The flash memory 39 stores a program described with code interpretable by the CPU 40. The CPU 40 controls the operations of the above-described components according to the program stored in the flash memory 39, and temporarily saves a portion of data required for the execution of control in the RAM 41.

Next, the optical pickup device 23 is explained with reference to FIG. 4 through FIG. 8B. The optical pickup device 23 includes a pickup core 101, which guides a laser beam onto the recording side of the optical disk 15 rotated by the spindle motor 22 and receives light flux reflected from the recording side of the optical disk 15. The optical pickup device 23 also includes a pair of seek rails 102 for guiding the motion of the pickup core 101 in the X direction, and a seek motor (not shown) for driving the pickup core 101 in the X directions.

The pickup core 101 has a housing 71, in which a light flux guiding optical system 12 for guiding light flux emitted from a light source toward the recording side of the optical disk 15 is accommodated. On the housing 71 is provided a condensing optical system 11 for condensing the light flux guided by the light flux guiding optical system 12 onto a prescribed position in the recording side of the optical disk 15.

Figure 5:
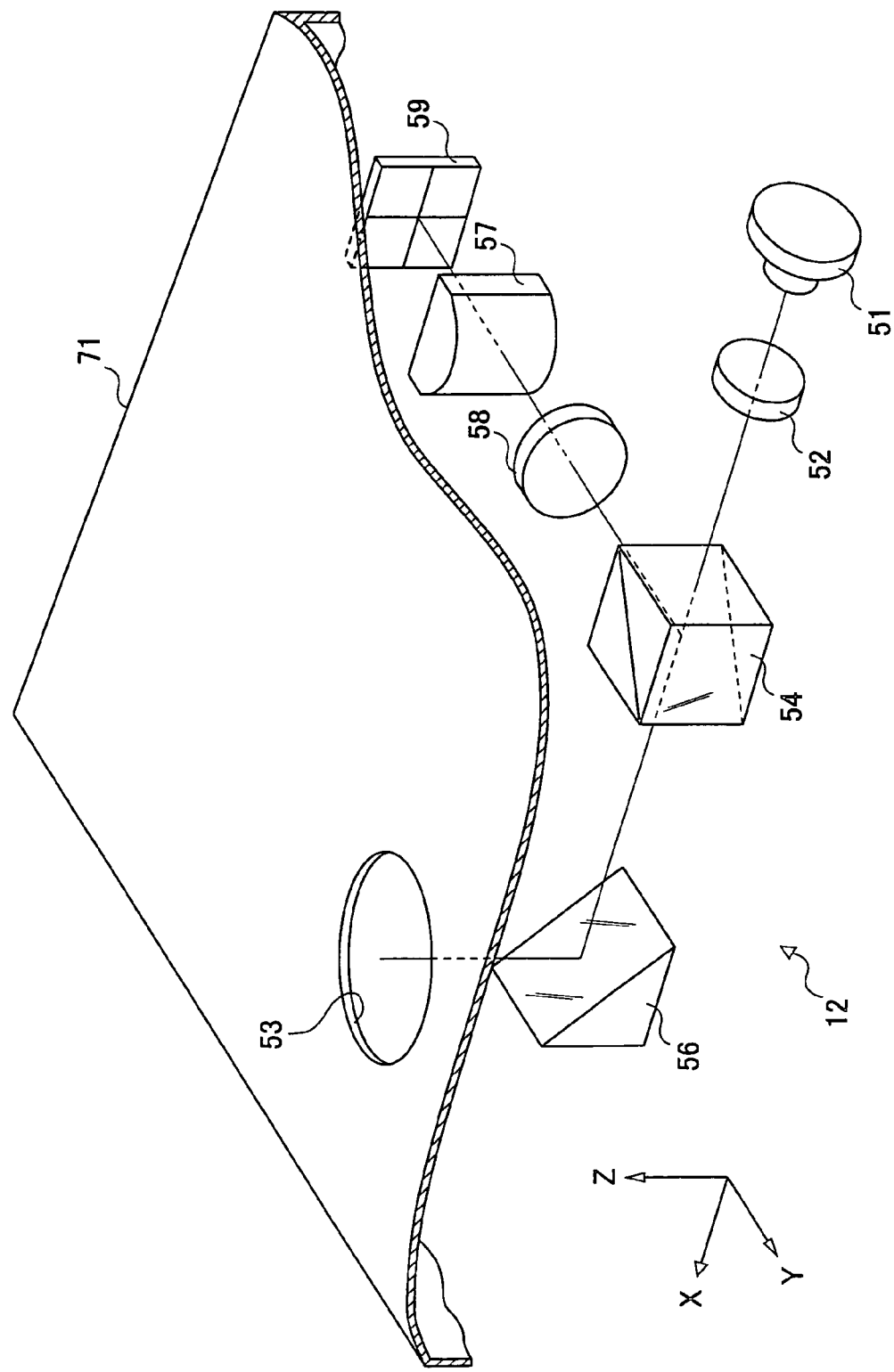
FIG. 5 is a perspective view illustrating the light flux guiding optical system used in the optical pickup device shown in FIG. 3.

As illustrated in FIG. 5, the light flux guiding optical system 12 includes a light source unit 51, a coupling lens 52, a beam splitter 54, an upward reflecting mirror 56, a detection lens 58, a cylindrical lens 57, and a light receiving unit (or a photodetector) 59.

The light source unit 51 has a semiconductor laser (not shown) that emits light flux with wavelength of 660 nm, and is fixed to the inner wall of the housing 71 such that the maximum intensity light emitting direction of the light flux of the light source unit 51 becomes the positive X (+X) direction.

The coupling lens 52 is positioned on the +X side of the light source unit 51 to make the light flux emitted from the semiconductor laser 51a substantially parallel. The beam splitter 54 is positioned on the +X side of the coupling lens 52. The beam splitter 54 deflects returned light flux reflected from the recording side of the optical disk 15 into the negative Y (−Y) direction. The upward reflecting mirror 56 is positioned on the positive X (+X) side of the beam splitter 54 in order to change the maximum intensity light emitting direction of the light flux transmitted through the beam splitter 54 to the positive Z (+Z) direction. The light flux reflected upward by the upward reflecting mirror 56 is incident on the condensing optical system 11 after passing through the opening 53 formed in the housing 71.

The detection lens 58 is positioned on the −Y side of the beam splitter 54 to collect the returned light flux having been deflected in the −Y direction by the beam splitter 54. The cylindrical lens 57 is positioned on the −Y side of the detection lens 58 to shape the return light flux collected by the detection lens 58. The light receiving unit 59 is positioned on the −Y side of the cylindrical lens 57, and receives the shaped return light flux at the light receiving plane. The light receiving unit 59 employs a quartered light receiving element, as in an ordinary optical disk apparatus. Each of the divided areas is referred to as a light receiving unit element for convenience, which outputs a signal representing the quantity of received light to the reproduced signal processing circuit 28. Thus, an optical path for guiding the light flux emitted from the semiconductor laser to the condensing optical system 11 and guiding the return light flux toward the light receiving unit 59 is formed inside the housing 71.

Figure 6A:
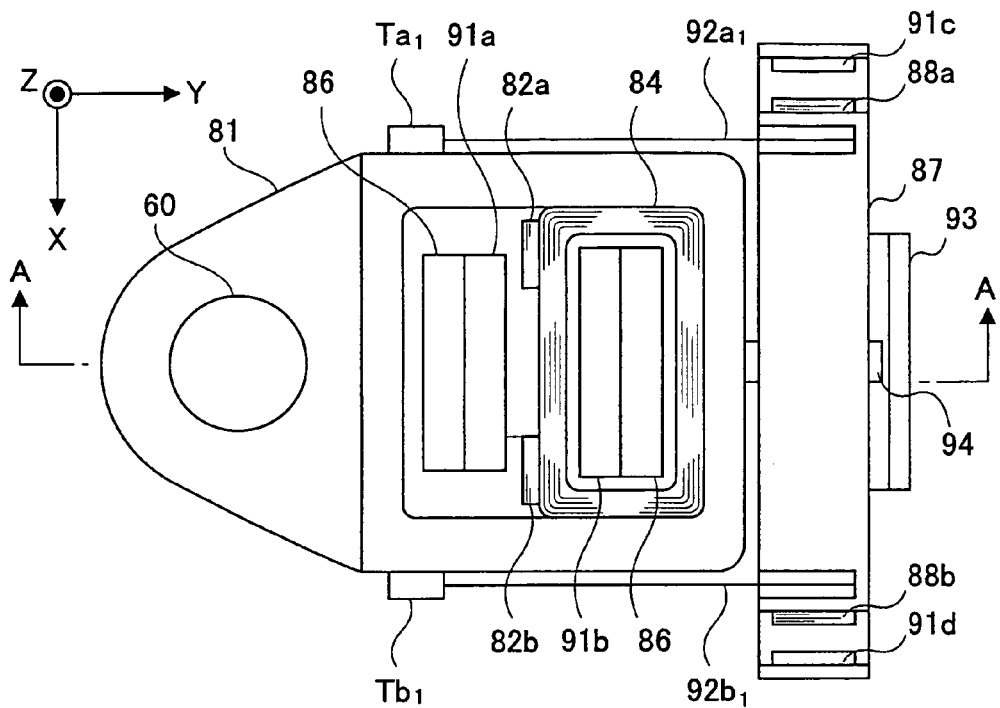
FIG. 6A is a plan view illustrating the condensing optical system used in the optical pickup device shown in FIG. 4.
Figure 6B:
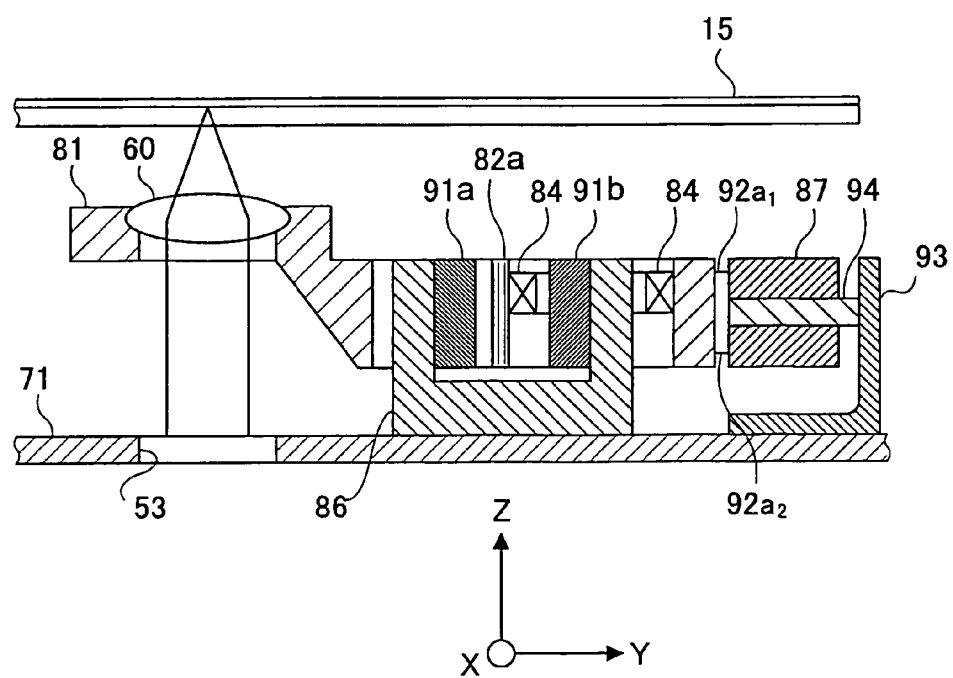
FIG. 6B is a cross-sectional view of the condensing optical system taken along the A—A line shown in FIG. 6A.

FIG. 6A and FIG. 6B illustrate the condensing optical system 11. FIG. 6B is a cross-sectional view taken along the A—A line show in FIG. 6A. The condensing optical system 11 includes an object lens 60, a lens holder 81 for holding the object lens 60, a pair of tracking coils (82a, 82b), a focusing coil 84, a yoke 86, a pair of tilt coils (88a, 88b) four permanent magnets (91a, 91b, 91c, and 91d), four conductive wire springs ($92a_1$, $92a_2$, $92b_1$, and $92b_2$), a wire spring fixing unit 87, a guide shaft 94, and a guide shaft fixing unit 93.

Figure 7A:
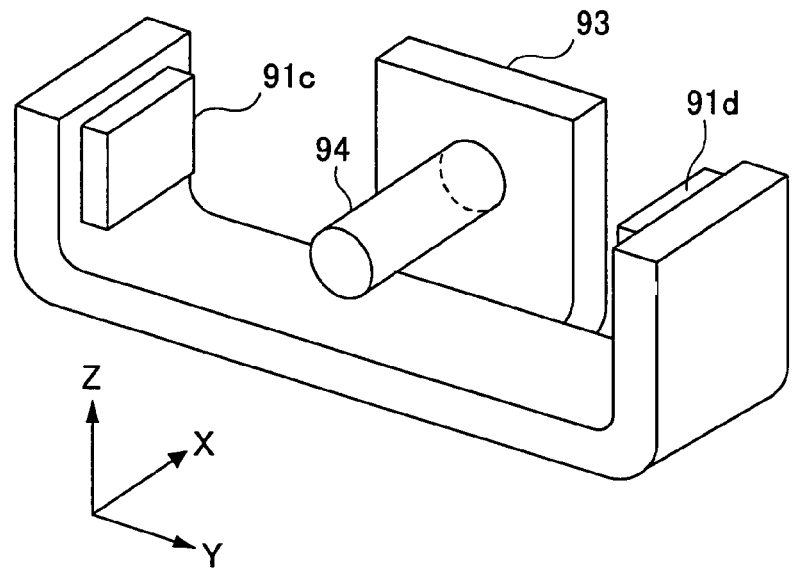
FIG. 7A is a perspective view of the guide shaft fixing unit shown in FIG. 6A.

As illustrated in FIG. 7A, the guide shaft fixing unit 93 has a bottom wall and three side walls extending in the Z direction from the bottom wall. The first side wall is located on the positive Y (+Y) side of the bottom wall, the second side wall is located on the negative X (−X) side of the bottom wall, and the third side wall is located on the positive X (+X) side of the bottom wall. The guide shaft 94 extends in the −Y direction from the inner face (i.e., the face on the −Y side) of the first side wall in such a manner that the longitudinal axis of the guide shaft agrees with the Y axis of the guide shaft fixing unit 93. The permanent magnet 91c is attached to the inner face (i.e., the face on the +X side) of the second side wall, and the permanent magnet 91d is attached to the inner face (i.e., the face on the −X side) of the third side wall. The permanent magnets 91c and 91d have substantially the same shape and magnetic characteristics.

Figure 7B:
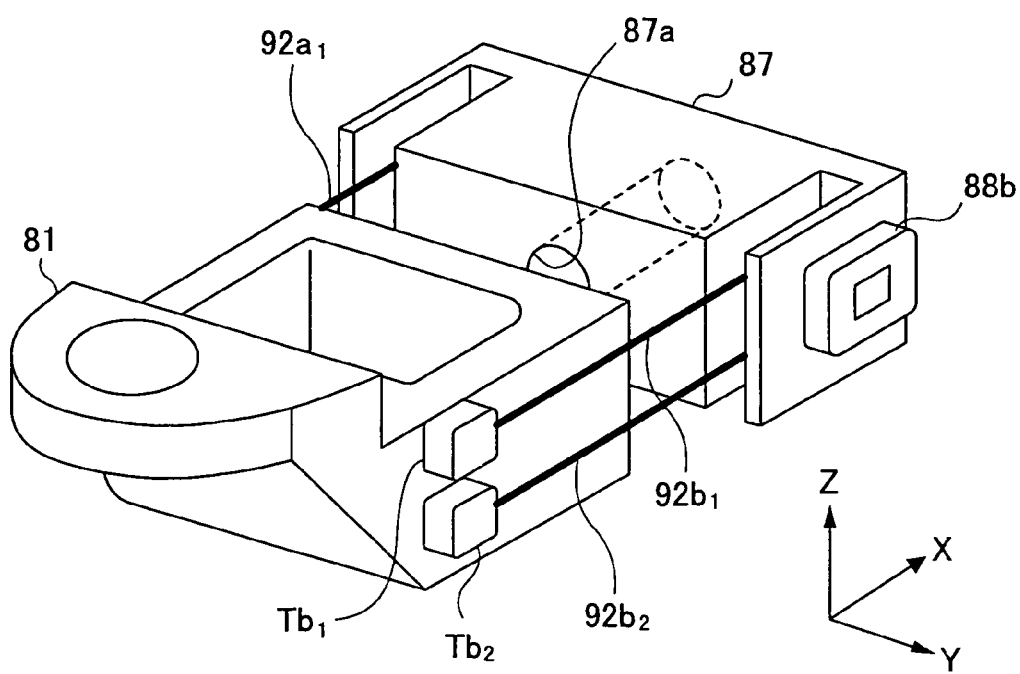
FIG. 7B is a perspective view of the lens holder and the wire spring fixing unit shown in FIG. 6A.

FIG. 7B illustrates the wire spring fixing unit 87 and the lens holder 81. The wire spring fixing unit 87 has multiple output terminals and input terminals (not shown). Each of the input terminals is connected to one of multiple signal lines extended from the driver 27 to receive one of focus driving current, tracking driving current, tilt driving current, and other parameters.

The wire spring fixing unit 87 has a cylindrical opening 87a penetrating through the wire spring fixing unit 87 in the Y directions. The guide shaft 94 is received in the opening 87a. The tilt coils 88a and 88b, which have substantially the same shape in this exampe, are provided to the wire spring fixing unit 87 at prescribed positions. The tilt coil 88a is positioned so as to face the permanent magnet 91c, while the tilt coil 88b is positioned so as to face the permanent magnet 91d, such that when driving current is supplied to each of the tilt coils 88a and 88b, a rotational force is created in order to rotate the wire spring fixing unit 87 about the guide shaft 94. The rotating direction is controlled by regulating the direction of the driving current flowing through the respective tilt coils. Each of the tilt coils 88a and 88b may have appropriate size and shape in accordance with the required rotational force.

The lens holder 81 is arranged such that the maximum intensity emitting direction of the light flux reflected by the upward reflecting mirror 56 in the +Z direction is substantially consistent with the optical axis of the object lens 60. Two tracking coils 82a, 82b, and a focusing coil 84 (not shown in FIG. 7B) are fixed to the lens holder 81 at predetermined positions. Since the object lens 60, the lens holder 81, the tracking coils 82a, 82b, and the focusing coil 84 move together, these components are collectively referred to as a "movable part" for convenience.

The lens holder 81 is furnished with terminals ($Ta_1$ and $Ta_2$) used to supply driving current to the tracking coils 82a and 82b, respectively, as well as terminals (Tb1 and $Tb_2$) used to supply driving current to the focusing coil 84. In this example, the terminals $Ta_1$ and $Ta_2$ are fixed to one side wall of the lens holder 81 located on the −X side, and the terminals $Tb_1$ and $Tb_2$ are fixed to the opposite side wall located on the +X side. The terminal $Ta_1$ is connected to one end of the wire spring $92a_1$, and the terminal $Ta_2$ is connected to one end of the wire spring $92a_2$. Similarly, the terminal $Tb_1$ is connected to one end of the wire spring $92b_1$, and the terminal $Tb_2$ is connected to one end of the wire spring $92b_2$.

Each of the wire springs 92 extends in the Y directions, and the other end of each wire spring is coupled to a prescribed output terminal of the wire spring fixing unit 87 by soldering. Accordingly, the movable part is held elastically with respect to the wire spring fixing unit 87. When the wire spring fixing unit 87 rotates about the guide shaft 94, the movable part also rotates together with the wire spring fixing unit 87.

Returning to FIGS. 6A and 6B, the yoke 86 has a U-shaped cross section with both ends located along the Y axis folded in the +Z direction, and the bottom of the yoke 86 is fixed to the housing 71 at a predetermined position. The side wall standing on the −Y side of the bottom is referred to as the first side wall, and the opposite wall standing on the +Y side of the bottom is referred to as the second side wall. The permanent magnet 91a is fixed to the inner face (i.e., the face on the +Y side) of the first side wall, while second permanent magnet 91b is fixed to the inner face (i.e., the face on the −Y side) of the second side wall, such that these two permanent magnets 91a and 91b face each other.

The focusing coil 84 is wound around the permanent magnet 91b and the second side wall of the yoke 86, so that a driving force is produced to drive the movable part either in the +Z direction or the −Z direction when driving current is supplied. The driving direction of the movable part can be controlled by regulating the direction of the driving current flowing through the focusing coil 84. The size and the shape of the focusing coil 84 may be selected according to the required driving force.

Two tracking coils (82a, 82b) are positioned so as to face permanent magnet 91a, such that a driving force is produced to drive the movable part in the +X direction or the −X direction when driving current is supplied. The driving direction can be controlled by regulating the direction of the driving current flowing through the tracking coils 82a and 82b. The sizes and shapes of the first and second tracking coils 82a and 82b may be selected according to the required driving force.

Figure 8A:
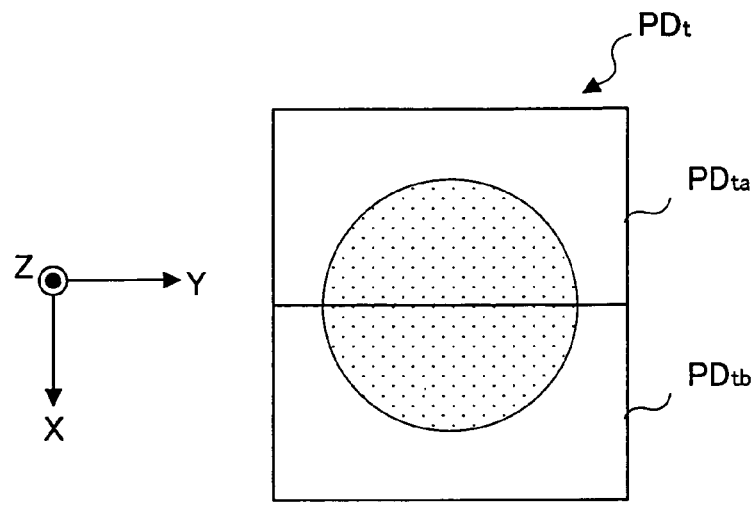
FIG. 8A is an example of the light receiving element used for the tilt sensor.
Figure 8B:
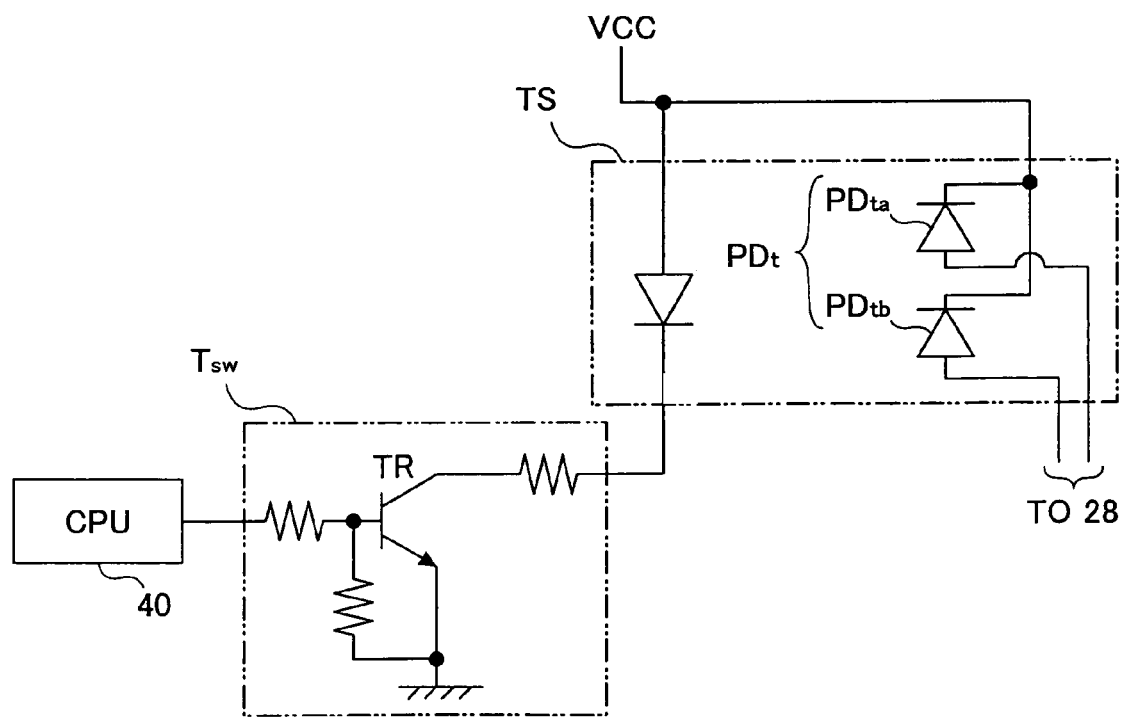
FIG. 8B is a circuit diagram of the tilt sensor.

FIG. 8A and FIG. 8B illustrate the tilt sensor TS, which is arranged on the housing 71. The tilt sensor TS has a light-emitting diode LDt emitting a tilt detecting light beam onto the optical disk 15, and a light receiving element PDt for receiving the tilt detecting light beam reflected from the optical disk 15. As illustrated in FIG. 8A, the light receiving element PDt is a halved light receiving element, consisting of a first half PDta and a second half PDtb. The light receiving element is designed such that the output from the first half PDta and the output from the second half PDtb differ from each other according to the inclination of the object lens 60 relative to the optical disk 15.

As illustrated in FIG. 8B, the light emitting diode LDt emits light when the switching circuit Tsw including a transistor TR is turned on in response to the tilt sensor driving signal supplied from the CPU 40. The output signal from each half of the light emitting element PDt is supplied to the reproduced signal processing circuit 28. The light emitting diode LDt may be driven directly by the CPU 40, without using the switching circuit Tsw. In the embodiment, an infrared LED is used as the light emitting diode LDt, and the light emitting diode LDt and the light receiving element PDt are arranged into a single unit.

Next, the operation of the above-described optical pickup device 23 is explained briefly. In this example, the optical pickup device 23 is loaded in the optical disk apparatus 20, such that the Z axis of the optical pickup device 23 is consistent with a direction perpendicular to the recording side of the optical disk 15, and that the Y axis is consistent with the tangential direction of the track. In other words, the X-axis direction is the tracking direction, and the Z-axis direction is the focusing direction.

<LD Control Signal>

The LD control signal output from the laser control circuit 24 is supplied to the light source unit 51, and light flux with an output level according to the LD control signal is emitted from the light source unit 51 in the +Z direction. The light flux is collimated by the coupling lens 52 into substantially parallel light, and strikes the beam splitter 54. The light flux having passed straight through the beam splitter 54 is reflected by the upward-reflecting mirror 56 to the +Z direction, and is incident on the condensing optical system 11 through the opening 53 of the housing 71. The light flux is concentrated onto the recording side of the optical disk 15 by the object lens 60 of the condensing optical system 11 to form a fine light spot thereon.

The return light flux reflected from the recording side of the optical disk 15 is shaped into substantially parallel light by the object lens 60, and is guided to the upward reflecting mirror 56 after passing through the opening 53 of the housing 71. The return light flux is reflected by the upward reflecting mirror 56 in the −X direction, and incident on the beam splitter 54, which deflects the return light flux in the −Y direction. The return light flux having passed through the beam splitter 54 is received at the light receiving unit 59 via the detection lens 58 and the cylindrical lens 57. Each of the light receiving portions forming the light receiving unit 59 outputs an electric current signal corresponding to the quantity of the received light to the reproduced signal processing circuit 28.

<Focus Driving Current>

Focus driving current is supplied from the driver 27 to the prescribed input terminal of the wire spring fixing unit 87 of the condensing optical system 11, and is further supplied to the focusing coil 84 via the wire springs $92a_2$ and $92b_2$. According to the level and the direction of the focus driving current, the movable part of the condensing optical system 11 moves in the focusing direction to a desired degree. Consequently, the object lens 60 is driven in the focusing direction to correct focus error.

<Tracking Driving Current>

Tracking driving current is supplied from the driver 27 to the prescribed input terminal of the wire spring fixing unit 87, and is further supplied to the tracking coils via the respective wire springs $92a_1$ and $92b_1$. According to the level and the direction of the tracking driving current, the movable part of the condensing optical system 11 moves in the tracking direction to a desired degree. Consequently, the object lens 60 is driven in the tracking direction to correct tracking error.

<Tilt Driving Current>

Tilt driving current is supplied from the driver 27 to the prescribed input terminal of the wire spring fixing unit 87, and is further supplied to the respective tilt coils. According to the level and the direction of the tracking driving current, the movable part of the condensing optical system 11 pivots about the guide shaft 94, together with the wire spring fixing unit 87. Consequently, the object lens 60 is rotated in the X-Z plane to correct the tilt.

Next, a recording process performed by the optical disk apparatus 20 to record user data in the optical disk 15 is explained.

In response to a recording command supplied from the host apparatus, the CPU 40 outputs a control signal to the driver 27 to control the rotation of the spindle motor 22 based on a designated recording rate. At the same time, the CPU 40 reports the receipt of the recording command from the host to the reproduced signal processing circuit 28. The CPU 40 also instructs the buffer manager 37 to store the user data supplied from the host in buffer RAM 34.

When rotation of the optical disk 15 has reached a prescribed linear velocity, the reproduced signal processing circuit 28 detects a track error signal and a focus error signal based on the output signal from the light receiving unit 59. The detected track error signal and the focus error signal are supplied to the servo controller 33, which then corrects the track error and focus error. The track error correction and the focus error correction are performed whenever necessary during the recording operation. The reproduced signal processing circuit 28 acquires ADIP information based on the output signal from the light receiving unit 59 at prescribed timing until the recording operation is finished, and supplies the ADIP information to the CPU 40.

The CPU 40 outputs a seek control signal to the driver 27, based on the ADIP information, to control the seek motor so as to bring the optical pickup device 23 to the writing start position. When the CPU 40 receives a signal from the buffer manager 37 indicating that the amount of the user data accumulated in the buffer RAM 34 has exceeded the prescribed level, the CPU 40 instructs the encoder 25 to start generating a writing signal.

When the optical pickup device 23 has been positioned at the writing start position, the CPU 40 starts the tilt correction process.

Figure 9:
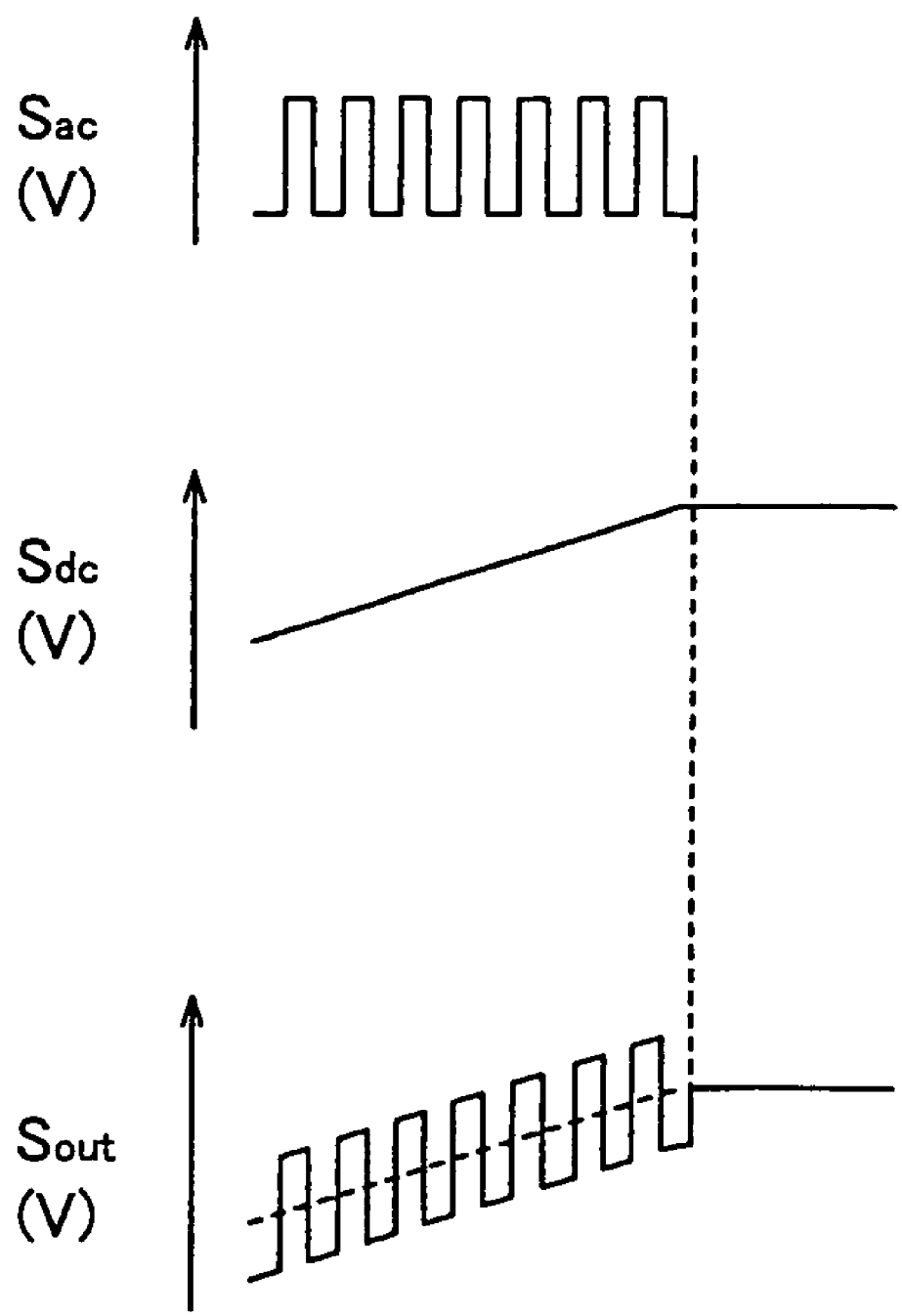
FIG. 9 is a timing diagram illustrating a superposed signal, a tilt correction signal, and a tilt control signal.

In the tilt correction process, the CPU 40 supplies the above-described tilt sensor driving signal to the tilt sensor TS, and at the same time, it instructs the reproduced signal processing circuit 28 to start tilt correction. The CPU 40 supplies a superposed signal Sac having prescribed amplitude and frequency to the tilt control signal generating circuit 28*h* shown in FIG. 3. An example of such a superposed signal Sac is illustrated at the top of FIG. 9. The optimum values of the amplitude and the frequency of the superposed signal Sac are determined in advance based on the total mass of the movable part and the wire spring fixing unit 87, and on the friction between the wire spring fixing unit 87 and the guide shaft 94, through experiment.

In response to the tilt sensor driving signal, the light emitting diode LDt of the tilt sensor TS emits a tilt detecting light beam, which is reflected from the optical disk 15 and received at the light receiving element PDt of the tilt sensor TS. Each of the light receiving element portions PDta and PDtb outputs a signal (electric current), corresponding to the quantity of received light, to the reproduced signal processing circuit 28.

The output signal from the tilt sensor TS is received at I/V amplifier 28*a* of the reproduced signal processing circuit 28, and converted to a voltage signal. This voltage signal is supplied as a tilt correction signal Sdc (see FIG. 9) to the tilt control signal generating circuit 28*h*, via the tilt sensor signal detection circuit 28*f* and the tilt correction signal generating circuit 28*g*.

In the tilt control signal generating circuit 28*h*, the signal Sac supplied from the CPU 40 is superposed onto the tilt correction signal Sdc at a prescribed adding ratio, and amplified with a prescribed gain. The resultant signal is output as a tilt control signal Sout to the driver 27. Since the signal Sac supplied from the CPU 40 is an alternating current signal, the tilt control signal Sout contains an alternating current component, as illustrated at the bottom of FIG. 9.

The driver 27 outputs a tilt driving current to the optical pickup device 23 in response to the tilt control signal Sout. The tilt driving current supplied to the optical pickup device 23 causes the object lens 60 to rotate in the X-Z plane so as to correct the inclination relative to the optical disk 15.

Upon finishing the tilt correction, the CPU 40 stops outputting the superposed signal Sac. Without the superposed signal, the output Sout of the tilt control signal generating circuit 28*h* becomes a direct current signal that does not contain any alternating current component, as illustrated in FIG. 9. The CPU 40 reports the completion of the tilt correction to the reproduced signal processing circuit 28, and allows the encoder 25 to start the writing operation. Then, the user data are written in the optical disk 15 through the encoder 25, the laser control circuit 24 and the optical pickup device 23. When all the user data are written, the recording operation is finished.

Next, the reproducing operation of the optical disk apparatus 20 for reproducing data from the optical disk 15 is briefly explained.

In response to a reproducing command supplied from the host apparatus, the CPU 40 outputs a control signal to the driver 27 to control the rotation of the spindle motor 22 based on a designated reproduction rate. At the same time, the CPU 40 reports the receipt of the reproducing command from the host to the reproduced signal processing circuit 28.

When rotation of the optical disk 15 has reached a prescribed linear velocity, track error and focus error are corrected, as in the recording operation. Track error correction and the focus error correction are performed whenever necessary until the reproduction process is completed.

The CPU 40 outputs a seek control signal to the motor driver 27, based on the ADIP information output from the reproduced signal processing circuit 28 at prescribed timing.

When the optical pickup device 23 has reached the reading start position, the CPU 40 carries out tilt correction, as has been described above. When the tilt correction is finished, the CPU 40 reports the completion of tilt correction to the reproduced signal processing circuit 28. Then, the reproduced signal processing circuit 28 detects an RF signal from the output of the light receiving unit 59, and stores the RF signal as reproduced data in the buffer RAM 34 after the decoding and error correction processes. When the reproduced data accumulated in the buffer RAM 34 reaches a predetermined amount for constituting sector data, the buffer manager 37 outputs the reproduced data to the host apparatus via the interface 38.

In the embodiment, the CPU 40 and the program executed by the CPU 40 used in the optical disk apparatus implement a processor. However, the present invention is not limited to these examples. A part or all of the process defined by the program executed by the CPU 40 may be replaced by a hardware structure.

In the optical disk apparatus according to the embodiment, a tilt correction apparatus is implemented by the reproduced signal processing circuit 28, the tilt coil (88a, 88b), and permanent magnet (91c, 91d). In other word, signal generating means is implemented by the tilt control signal generating circuit 28h of the reproduced signal processing circuit 28, and driving means is implemented by the tilt coils (88a, 88b) and the permanent magnets (91c, 91d).

In addition, a tilt driving signal generating circuit is implemented by the tilt control signal generating circuit 28h, and a superposition unit is implemented by the adding amplifier Padd.

The tilt correction method according to the invention is implemented by the operation of the tilt control signal generating circuit 28h.

In the optical disk apparatus according to the embodiment, tilt correction is carried out when the optical pickup device 23 has been positioned at the writing start position in response to a recording command from the host. In the tilt correction, an alternating current signal (or an AC voltage signal) with prescribed amplitude and frequency is superposed on the tilt correction signal generated based on the output signal from the tilt sensor TS to produce a tilt control signal, which is used to rotate the wire spring fixing unit 87 about the guide shaft 94. Since the amplitude and the frequency of the alternating current signal are selected taking into account the total mass of the movable part and the wire spring fixing unit 87, as well as the friction between the wire spring fixing unit 87 and the guide shaft 94, the rotation of the wire spring fixing unit 87 can be controlled accurately. Consequently, the wire spring fixing unit 87 rotates about the guide shaft 94 without delay, and the inclination of the object lens 60 relative to the optical disk 15 can be corrected precisely at accurate timing. This arrangement does not cause increase of the size and the cost of the apparatus.

Because the tilt control signal produced through superposition contains an alternating current component, undesirable tight contact is prevented between the movable part and the surrounding components even if they come into contact with each other. In other word, the movable part can operate smoothly, maintaining appropriate positional relation with the surrounding components.

Recently, portable personal computers are made very compact and light, made possible by rapid progress in miniaturization of electronic components. So-called notebook computers and further miniaturized subnotebook computers (hereinafter, collectively referred to as "notebook computers") are commercially available. Since notebook computers are used anywhere with little constraint, not only an AC source, but also a battery is used as the power supply of notebook computers. Battery operable time becomes a more important factor of performance of notebook computers, and it affects the sales of notebook computers. In battery operable notebook computers with a built-in optical disk recorder/player, the optical disk recorder/player is also driven by battery. This means that reduction of power consumption of the optical disk recorder/driver is greatly desired.

Tilt correction of the present invention is suitable to such demand for reducing power consumption because the CPU 40 stops outputting superposed signals to the tilt control signal generating circuit 28h upon completion of tilt correction. Accordingly, power consumption can be prevented from increasing due to tilt correction.

In addition, by guaranteeing smooth motion of the movable part of the optical pickup device, inclination of the object lens can be corrected precisely at accurate timing prior to the recording and reproducing operations. Consequently, reliable and stable access to the optical disk can be achieved.

Figure 10A:
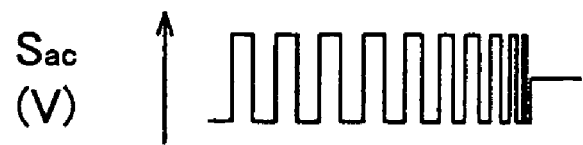
FIG. 10A through FIG. 10C show modifications of the superposed signal.
Figure 10B:
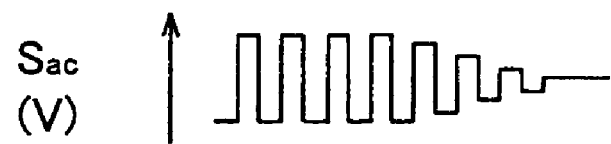
Figure 10C:

In the embodiment shown in FIG. 9, the amplitude and the frequency of the superposed signal Sac are kept constant throughout the signal output period. However, the invention is not limited to this example, and the frequency of the superposed signal Sac may be gradually increased toward the end of the signal output period, as illustrated in FIG. 10A. Alternatively, the amplitude of the superposed signal Sac may be gradually decreased toward the end of the signal output period, as illustrated in FIG. 10B. In addition, as illustrated in FIG. 10C, the frequency of the superposed signal Sac is gradually increased, while the amplitude is gradually decreased, toward the end of the signal output. By regulating the frequency and/or the amplitude of the superposed signal Sac in the manner shown in FIG. 10A through FIG. 10C, the follow ability of the movable part with respect to the alternating current component contained in the tilt control signal is gradually moderated, and the correction accuracy can be further improved. The amplitude and the frequency of the superposed signal Sac may be varied in a stepwise manner.

In the embodiment, tilt or inclination of the object lens is detected by the tilt sensor TS; however, tilt may be detected from a push-pull signal for track error detection output from the light-receiving unit 59, or from the signal amplitude or jitter of a reproduced signal.

Although in the embodiment two tilt coils are used to pivot the object lens 60 in the X-Z plane, the invention is not limited to this example. Similarly, the invention is not limited to the embodiment in which two tracking coils are used to drive the object lens 60 in the tracking direction, or to the embodiment in which a focusing coil is used to drive the object lens 60 in the focusing direction.

In the above-described embodiment, tilt correction is started when the optical pickup device 23 has reached the wiring starting position, prior to the data recording operation. However, tilt correction may be started when the optical pickup device 23 has reaches the vicinity of the writing staring position. Similarly, in the reproducing operation, tilt correction may be started when the optical pickup device has reached the vicinity of the reading start position.

If the flatness of the optical disk is guaranteed to a certain extent, tilt correction may be started when the optical disk is loaded in the optical disk apparatus. In this case, tilt correction does not have to be performed in the recording or reproduced operation.

In the embodiment, inclination of the object lens in the radial direction perpendicular to the tangent to the track of the optical disk is corrected, which is referred to as correction of "radial tilt". The present invention is also applicable to correction of inclination of the object lens in the tangential direction of the optical disk, which is referred to as correction of "tangential tilt". In this case, the object lens is rotated in the Y-Z plane.

In the embodiment, a tilt control signal is generated by the reproduced signal processing circuit. Alternatively, a dedicated tilt control circuit using the tilt sensor signal detection circuit 28f, the tilt correction signal generating circuit 28g, and the tilt control signal generating circuit 28h, may be provided separate from the reproduced signal processing circuit.

The function of at least one of the tilt sensor signal detection circuit 28f, the tilt correction signal generating circuit 28g, and the tilt control signal generating circuit 28h may be executed by the CPU 40.

In the embodiment, output of the superposed signal Sac is stopped when tilt correction is finished. However, when the access time to the optical disk is short or when the optical disk apparatus is driven by an AC source, then the superposed signal Sac may be output until the access to the optical disk (such as the recording operation or the reproducing operation) is finished, as illustrate in FIG. 11. In this case, the frequency of the superposed signal Sac may be increased gradually, and/or the amplitude of the superposed signal Sac may be decreased gradually.

Instead of stopping the output of the superposed signal Sac at the end of tilt correction, the output of the superposed signal Sac may be stopped after the movable part of the optical pickup device starts rotating about the guide shaft if it is expected that the friction of the movable part and the guide shaft is not so large. This is because the static frictional force at the start of rotation is generally greater than the sliding frictional force during rotation.

Because the friction between the movable part and the guide shaft changes depending on the environmental conditions, such as the temperature, the amplitude and the frequency of the superposed signal may be adjusted in advance according to the temperature.

In the embodiment, a driving mechanism for correcting the tilt has been described above using the example in which the movable part of the optical pickup device is rotated about the guide shaft. However, other mechanisms for correcting the tilt may be employed.

Although in the embodiment the information recording medium is based on the DVD standard, other types of information recording media based on, for example, the CD standard may be used.

In the embodiment, the optical pickup device uses a single semiconductor laser. The invention is not limited to this example and multiple semiconductor lasers with different wavelengths may be used. In this case, at least one of the wavelengths of 405 nm, 660 nm, and 780 nm is used.

In the embodiment, the optical disk apparatus is capable of recording and reproduction of information. However, the optical disk apparatus may perform at least a recording operation among recording, reproducing, and erasing operations.

The interface 38 is not limited to the ATAPI standard used in the embodiment, and another type of interface based on, for instance, ATA (AT Attachment) SCSI (Small Computer System Interface), USB (Universal Serial Bus) 1.0, USB 2.0, IEEE 802.3, Ser. ATA, or serial ATAPI standard, may be used.

As has been described above, with the tilt correction technique of the present invention, inclination of the object lens relative to the information recording medium is corrected precisely, without causing increases in the size and the cost of the tilt correcting apparatus.

With the tilt driving signal generating circuit of the present invention, a driving signal suitable to accurate correction for the inclination of the object lens relative to an information recording medium is produced without causing the size and the cost of the circuit to increase.

With the optical disk apparatus of the present invention, accurate and reliable access to the information recording medium is realized.

This patent application is based on and claims the benefit of the earlier filing date of Japanese Patent Application No. 2003-033478 filed Feb. 12, 2003, the entire contents of which are hereby incorporated by reference.

The invention claimed is:

1. A tilt correction method for correcting an inclination of an object lens relative to an information recording medium, comprising the steps of:
    detecting the inclination of the object lens relative to the information recording medium,
    producing a direct current signal for correcting the inclination of the object lens;
    superposing an alternating current signal having a prescribed signal characteristic onto the direct current signal to produce a driving signal; and
    correcting the inclination of the object lens using a driving mechanism operated by the driving signal.

2. The method of claim 1, wherein the alternating current signal is produced such that the prescribed signal characteristic varies depending on a tilt correction condition.

3. The method of claim 1, further comprising the step of:
    stopping the superposition of the alternating current signal when the inclination is substantially corrected and supplying only the direct current signal as the driving signal to the driving mechanism.

4. The method of claim 1, wherein the alternating current signal is produced such that the amplitude of the alternating current signal gradually decreases during at least a portion of a period for supplying the alternating current signal.

5. The method of claim 1, wherein the alternating current signal is produced such that the frequency of the alternating current signal gradually increases during at least a portion of a period for supplying the alternating current signal.

6. The method of claim 1, wherein the alternating current signal is produced such that the amplitude of the alternating current signal gradually decreases, while the frequency of the alternating current signal gradually increases, during at least a portion of a period for supplying the alternating current signal.

7. The method of claim 1, wherein the driving signal is a voltage signal.

8. The method of claim 1, wherein the inclination of the object lens is corrected by driving a movable part that holds the object lens against friction between the movable part and a shaft supporting the movable part.

9. A tilt driving signal generating circuit for generating a driving signal used to drive a movable part holding an object lens to correct an inclination of the object lens relative to an information recording medium; comprising:
 a first input terminal for receiving a direct current signal representing information about the inclination of the object lens; and
 a superposition unit for superposing an alternating current with a prescribed signal characteristic onto the direct current signal to produce the driving signal.

10. The driving signal generating circuit of claim 9, further comprising:
 a second input terminal for receiving the alternating current signal.

11. A tilt correction apparatus for correcting an inclination of an object lens relative to an information recording medium, comprising:
 a tilt detection unit that detects the inclination of the object lens relative to the information recording medium;
 a first signal generating circuit that produce a direct current signal representing information about the inclination of the object lens;
 a second signal generating unit that superposes an alternating current signal having a prescribed signal characteristic onto the direct current signal to produce a driving signal; and
 a driving mechanism that corrects the inclination of the object lens relative to the information recording medium in response to the driving signal.

12. The tilt correction apparatus of claim 11, wherein the second signal generating unit superposes the alternating current signal having a variable signal characteristic onto the direct current signal, the signal characteristic varying according to a tilt correcting condition.

13. The tilt correction apparatus of claim 11, wherein the second signal generating unit stops superposition when the inclination is substantially corrected, and thereafter outputting only the direct current signal to the driving mechanism.

14. The tilt correction apparatus of claim 12, wherein the second signal generating unit superposes the alternating current signal having variable amplitude that gradually decreases during at least a portion of the superposing period.

15. The tilt correction apparatus of claim 12, wherein the second signal generating unit superposes the alternating current signal having variable frequency that gradually increases during at least a portion of the superposing period.

16. The tilt correction apparatus of claim 12, wherein the second signal generating unit superposes the alternating current signal having variable amplitude that gradually decreases during at least a portion of the superposing period and variable frequency that gradually increases during said portion of the superposing period.

17. The tilt correction apparatus of claim 11, wherein the driving mechanism rotates a movable part holding the object lens about a shaft against friction between the movable part and the shaft.

18. An optical disk apparatus for performing at least one of recording, reproducing and erasing operations with respect to an information recording medium, comprising:
 a light source for emitting a light beam;
 an optical system including an object lens for concentrating the light beam onto a recording side of the information recording medium and for guiding a return light beam reflected from the recording side to a predetermined light receiving position;
 a photodetector positioned at the light receiving position;
 a processing unit that carries out at least one of the recording, reproducing, and erasing operations based on an output signal from the photodetector;
 a tilt detection unit that detects inclination of the object lens relative to the information recording medium;
 a first signal generating circuit that produces a direct current signal representing information about the inclination of the object lens;
 a second signal generating unit that superposes an alternating current signal having a prescribed signal characteristic on the direct current signal to produce a driving signal; and
 a driving mechanism that corrects the inclination of the object lens relative to the information recording medium in response to the driving signal.

* * * * *